Dec. 18, 1956
U. NISTRI
2,774,278
AUTOGRAPH PHOTOGRAMMETRIC PLOTTING DEVICES
BASED ON THE DEVILLE PRINCIPLE
Filed June 2, 1953
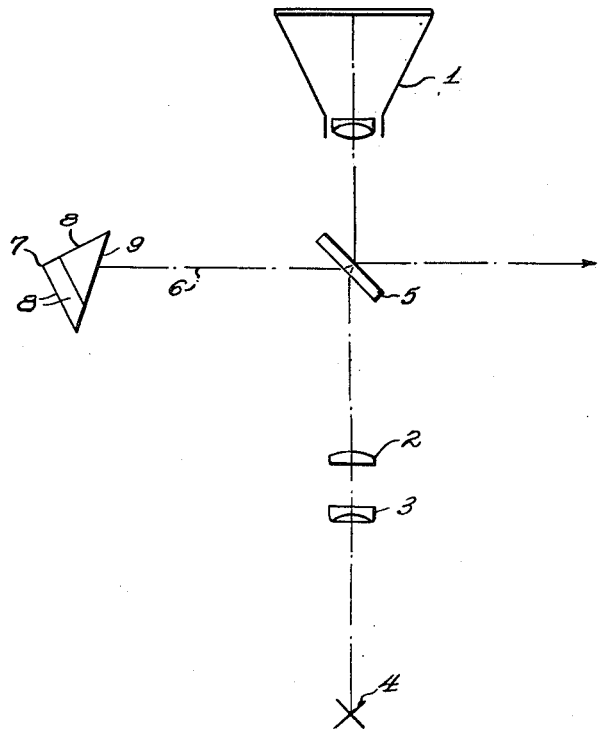
INVENTOR
*UMBERTO NISTRI*
BY Elmer Jamison Gray
ATTORNEY United States Patent Office 2,774,278
Patented Dec. 18, 1956

2,774,278

AUTOGRAPH PHOTOGRAMMETRIC PLOTTING DEVICES BASED ON THE DEVILLE PRINCIPLE

Umberto Nistri, Rome, Italy

Application June 2, 1953, Serial No. 359,177

1 Claim. (Cl. 88—24)

In autograph photogrammetric plotting devices based on the Deville system and subsequently improved by Nistri (Industrial Patent No. 463,343 of April 26, 1951) the fusion of the beams of parallel rays coming from the projecting camera and from the movable mark, takes place in the intermediate zone between the respective lenses through a special prism which presents an internal semi-reflecting face and a roof-type surface for the transmission of the mark carriers which, passing again through the said semi-reflecting surface, emerge from it in coincidence with the rays coming from the projecting camera and in a direction generally, though not necessarily, perpendicular to the original direction common to the two parallel incident beams.

The solution, while perfectly correct and meeting requirements, still presents the disadvantage of giving rise, within the prism, to successive reflections which cause weak but sometimes visible secondary images which it would be suitable to eliminate.

The object of the present invention is to realize a reflecting system which permits causing fusion of the parallel beams in a single direction as desired (normally perpendicular to the original direction) without producing parasite images.

The figure shows the plan for realizing this objective. From the projecting camera 1, represented schemactially without any representation of the positioning movements common to all plotting devices but which are not of interest for the purposes of the present specification, emerge the parallel rays coming from a point on the photographic plate, while from the collimating device 2—3 come the parallel rays from mark 4. Lens 2 of the collimating device may be movable (pancratic system) or fixed (fixed mark collimators) without this modifying the form or function of the reflecting system which is the subject of the present invention. Said system consists of a semi-reflecting mirror with plane parallel faces 5, arranged inclined (generally at 45°) with respect to the common direction of the parallel beams emerging from the projecting camera and from the mark, and arranged in such a manner that the rays emerging from the projecting camera are directed towards the optical system of observation (direction of the arrow). The rays coming from the mark will therefore be reflected in the same direction but in the opposite sense 6; a prism is arranged on their path, said prism 7 being of the triple reflecting type, that is, having the three reflecting faces 8 arranged at right angles to each other. Said prism, as is known, has the property of redirecting the rays in the same direction from which they came whatever the angle of incidence of said rays in respect to the entry face 9 of the prism. In other words, the rays will be redirected in the same direction and, after having passed through mirror 5, will find themselves perfectly parallel to the rays coming from the projecting camera. The required fusion of the two beams will thus have been obtained.

Of all the optical surfaces of the system, the only one which might give a parasite image is the entry surfaces 9 of prism 7; to avoid this, it is merely necessary that the prism itself be inclined, as shown in the figure, by more than half the angle of the semi-field of the system of observation. Such an inclination, because of the known and already mentioned property of right-angle trihedral prisms, has no influence on the 180° reflection of the incident beam.

What I claim is:

In an autographic plotting device, a photogrammetric projecting camera for projecting an image of points to be plotted, means defining a reference mark movable with respect to the camera axis to enable tracing of the contour features of the projected image upon relative movement of the mark and the camera, a collimator for collimating the rays proceeding from said mark, a plane semi-transparent reflector mounted between said camera and the reference mark and oriented so as to reflect a part of the rays from the camera and a part of the rays from the mark in opposite directions along substantially a common axis, and a trihedral reflector prism disposed on said common axis for reflecting said part of the rays from the mark back along said common axis to merge for observation with the part of the camera rays reflected by said reflector; the entry face of said trihedral prism being tilted with respect to said common axis through an angle at least equal to half the angle of the semi-field of the observing system, whereby fused images of the camera rays and of the mark are visible along said common axis free from secondary reflections.

References Cited in the file of this patent

UNITED STATES PATENTS

| 1,565,533 | Twyman | Dec. 15, 1925 |
| 1,705,146 | Willson | Mar. 12, 1929 |
| 2,216,325 | Ryder | Oct. 1, 1940 |